B. HERSHEY.
Machine for Welding Chain Links.

No. 166,369.  Patented Aug. 3, 1875.

Witnesses:
Edwin James.
John R. Jones.

Inventor:
Benjamin Hershey.
per J. E. F. Holmead.
Attorney.

UNITED STATES PATENT OFFICE.

BENJAMIN HERSHEY, OF ERIE, PENNSYLVANIA, ASSIGNOR TO PITTSBURGH CHAIN AND CAR-LINK MANUFACTURING COMPANY.

IMPROVEMENT IN MACHINES FOR WELDING CHAIN-LINKS.

Specification forming part of Letters Patent No. 166,369, dated August 3, 1875; application filed March 25, 1875.

CASE J.

*To all whom it may concern:*

Be it known that I, BENJAMIN HERSHEY, of the city and county of Erie, and State of Pennsylvania, have invented certain Improvements in Dies for Welding-Machines, of which the following is a full, clear, and exact description, reference being had to the accompanying drawing and the letters of reference marked thereon, making a part of this specification, in which—

Figure 1:
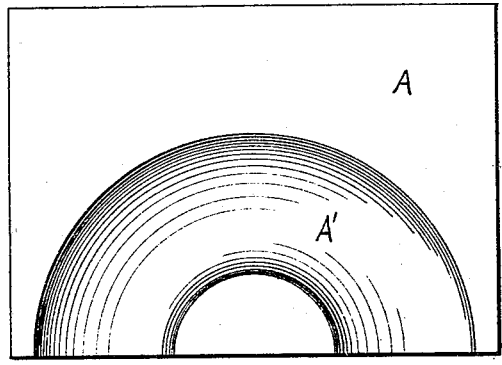
Figure 2:
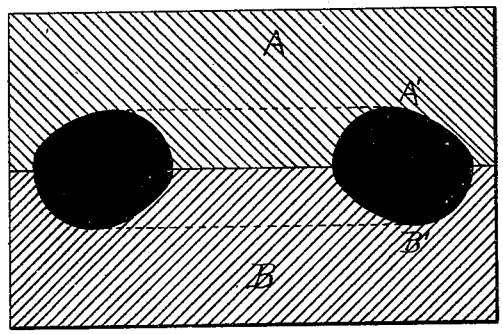
Figure 3:
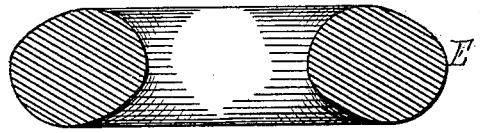

Figure 1 is a top-plan view of one of the dies. Fig. 2 is a vertical sectional view of both of the dies when in position. Fig. 3 is the form of a section of the link after being welded.

My present invention relates entirely to the dies, or rather the contour of their cavities, through whose action the welding of the lapped scarfed ends of the link is effected, and which provide a suitable means of working in and utilizing in the most advantageous manner the surplus or excess of metal which the lapping of the scarfed end of the link provides.

The nature of my invention consists in giving to the cavity of each die a contour which is a semi-oblique ellipse in cross-section, so cutting away the face of one die that the deepest section of its cavity shall be outside of the curvilineal line of its center, while in the opposite or mate die its face is so cut away as to leave the deepest section of its cavity inside of the curvilineal line of its center.

The construction and operation of my invention are as follows: A B are the dies or a set of dies which are designed to effect the welding of the scarfed or lapping edges of the open sections of a bent link. The dies may be secured in a suitable machine, so as to be operated in the usual manner. The cavities A' B' of these dies are of semi-oblique ellipse contour, so that the form of the print which they impart to the section of the link which is welded through their joint action is an oblique ellipse, as clearly shown at E, Fig. 3. The general form or outline of the cavities A' B' is clearly shown in Fig. 1. In the die A the cavity A' is formed by so cutting away the face of the die as to leave the deepest swelling section of its curve C outside of a curvilineal line drawn through its center, while in the die B its cavity B' is exactly the reverse—that is, the deepest swelling section of its curve D is inside of a curvilineal center. These cavities, through their joint action, impart the form of an oblique ellipse to the welded section of the link, as clearly shown in Fig. 3. The link having been thus welded through the action of the dies A B, and the welded section of the link being printed in the form shown in Fig. 3, it is now subjected to the action of finishing-dies, and which reduce its oblique swell to the desired form, or to a form in harmony with the general contour of the blank.

What I claim as new, and desire to secure by Letters Patent of the United States, is—

The dies A B for welding chain-links, constructed as shown and described—that is to say, the cavity being of a somewhat oblong or elliptical contour, its major axis lying oblique to a plane passing through its two limbs, in virtue of which form the greater portion of the metal acted upon by the die A is thrown laterally inside the center of its cavity, while the greater portion of the metal acted upon by the die B is thrown laterally outside the center of its cavity, substantially as and for the purpose set forth.

In testimony whereof I have signed my name to this specification in the presence of two subscribing witnesses.

B. HERSHEY.

Witnesses:
EDWIN JAMES,
JOS. T. K. PLANT.